United States Patent [19]

Shannon et al.

[11] 4,380,798
[45] Apr. 19, 1983

[54] SEMAPHORE REGISTER INCLUDING OWNERSHIP BITS

[75] Inventors: Paul D. Shannon; William C. Bruce, Jr., both of Austin, Tex.

[73] Assignee: Motorola, Inc., Schaumburg, Ill.

[21] Appl. No.: 187,259

[22] Filed: Sep. 15, 1980

[51] Int. Cl.³ .............................................. G06F 15/16
[52] U.S. Cl. ............................................... 364/200
[58] Field of Search ... 364/200 MS File, 900 MS File

[56] References Cited

U.S. PATENT DOCUMENTS

| | | | |
|---|---|---|---|
| 3,919,692 | 11/1975 | Kronies et al. | 364/200 |
| 4,096,572 | 6/1978 | Namimoto | 364/200 |
| 4,115,851 | 9/1978 | Nagano et al. | 364/200 |
| 4,124,304 | 7/1980 | Shimizu et al. | 365/200 |
| 4,145,739 | 3/1979 | Dunning et al. | 364/200 |
| 4,214,305 | 7/1980 | Tokita et al. | 364/200 |

OTHER PUBLICATIONS

Duke, K. A. and Messina, B. V., *Multiprocessing Storage Conflict Resolution Technique,* IBM Technical Disclosure Bulletin, vol. 15, No. 10, Mar. 1973, pp. 3232-3233.

*Primary Examiner*—Joseph F. Ruggiero
*Assistant Examiner*—Gary V. Harkcom
*Attorney, Agent, or Firm*—Anthony J. Sarli, Jr.; Vincent B. Ingrassia; Jeffrey Van Myers

[57] ABSTRACT

A semaphore register for use in a peripheral controller includes a semaphore bit which when not set indicates the availability of a shared resource, an internal ownership bit which when set indicates ownership of the resource by a peripheral controller and an external ownership bit which when set indicates ownership of the resource by a host processor. If the semaphore is clear, upon receipt of a read signal from the peripheral controller, the semaphore bit and the internal ownership bit are set. Upon receipt of a read signal from the host processor, the semaphore bit and the external ownership bit are set. Arbitration logic includes means responsive to simultaneous reads by the host processor and the peripheral controller for indicating to the host processor that the resource is unavailable thus giving priority to the peripheral controller. The semaphore bit may be reset by write signals from either the peripheral controller or the host processor.

3 Claims, 3 Drawing Figures

SEMAPHORE REGISTER INCLUDING OWNERSHIP BITS

BACKGROUND OF THE INVENTION

1. Field of the Invention

This invention relates generally to a programmable microcomputer and, more particularly, to a system peripheral controller which decreases the processing load of its host computer by performing a portion of the system tasks.

Description of the Prior Art

One of the more difficult aspects of designing a peripheral controller relates to the nature of its interface with its host computer. For example, two problems associated with such an interface focus on which of the peripheral controller's resources can be directly accessed by the host computer, and the nature of communications between the peripheral controller and its host. If, for example, the interface is based on a dual-port random-access-memory (RAM) which can be directly accessed by either the host or the peripheral controller, it is possible that both processors may attempt to access the same byte of information at the same time. It is also possible that one or both accesses involve a write cycle, thus rendering the information stored in the particular RAM location indeterminate. Therefore, it is necessary that mutually exclusive access to RAM locations be assured.

One approach to providing the required exclusivity centers around a bus arbitration scheme; however, this is not an attractive approach due to the possibility that both the peripheral controller and its host computer could be synchronous machines and thus present serious timing difficulties. In addition, operation on opposite phases of the system clock is not practical due to memory access time limitations.

The fundamental concept of using a semaphore was originally proposed by E. W. Dijkstra in 1965 in his paper, "Cooperating Sequential Processes," Mathematics Department, Technological University, Eindhoven, The Netherlands. The use of a semaphore could provide a solution to the problem of controlling accesses to the RAM provided a suitable implementation for the semaphore could be found.

SUMMARY OF THE INVENTION

It is an object of the present invention to provide a semaphore register for controlling access by a host processor and a peripheral controller to an interface random access memory (RAM).

It is a further object of the present invention to provide a semaphore register for controlling access to a RAM and which further includes ownership bits which indicate whether the peripheral controller or its host processor was last granted access to the RAM.

According to one aspect of the invention, there is provided a semaphore register for use in a data processing system which controls access to a resource shared by first and second processors from first and second data buses, comprising: master logic means for receiving requests for access to said resource from said first and second processors; slave logic means coupled to said master logic means for generating control signals indicative of the availability of said resource and indicative of which of said first and second processors have ownership of said resource; and arbitration logic means coupled to said slave logic means and responsive to simultaneous requests for access from said first and second processors for giving ownership of said resource to said first processor and indicating to said second processor that said resource is unavailable.

According to a further aspect of the invention, there is provided a semaphore register for use in a peripheral controller, said register for controlling access to a resource shared by said peripheral controller from an internal data bus and a host processor from an external data bus, comprising: a semaphore bit which when reset indicates the availability of said resource; an internal ownership bit which when set indicates most recent ownership of said resource by said peripheral controller; an external ownership bit which when set indicates most recent ownership of said resource by said host processor; first means for setting said semaphore bit and said internal ownership bit upon receipt from said peripheral controller of a read signal; second means for setting said semaphore bit and said external ownership bit upon receipt from said host processor of an external read signal; and arbitration logic means responsive to simultaneous internal and external read signals for indicating to said host processor that said resource is unavailable.

The above and other objects, features and advantages of the present invention will be more clearly understood from the following detailed description taken in conjunction with the accompanying drawings, in which:

DESCRIPTION OF THE PREFERRED EMBODIMENT

A semaphore bit may be assigned by a programmer as the arbitrator for a particular resource. The choice of assignment of the resource to a semaphore and any privileges attached to ownership are defined solely by the programmer. When a processor wishes to "own" a particular resource assigned to the semaphore, it "reads" or "tests" the semaphore bit. If, for example, the value of the semaphore bit is a "zero" during the test, the processor may conclude that the semaphore has arbitrated in its favor, and software then determines what privileges may be exercised by the processor. The semaphore bit is then set during the following clock cycle (C1). When the semaphore bit is set, it indicates that the assigned resource is busy or not available. Thus, if the processor reads a "one," then it should not attempt to access the resource because it is "owned" by the other processor. The processor may continue to attempt to obtain use of the resource by repeatedly reading the semaphore bit but it should not utilize the resource until the semaphore bit returns to a value of "zero." The semaphore bit may be reset by a write operation from either processor, even though it may be "owned" by the other processor, the writing of a semaphore by either processor requires only the address of the semaphore and the write signal. Any data on the data bus is ignored.

The inventive semaphore register assures that one and only one processor can be granted ownership of the resource. Under worst case conditions, both processors (i.e. the host processor and the peripheral controller) may access the semaphore bit at the same time. If the semaphore bit is "zero" when read by both processors, the semaphore hardware must intervene to permit only the peripheral processor to read the actual value of the semaphore (i.e. zero) while providing an artificial "one" (resource not available) to the host processor (the external processor). Except for this special condition (simultaneous reads), both the host processor and the peripheral controller (the internal processor) read the actual value of the semaphore bit. When, for example, the peripheral controller gains ownership of the resource, the semaphore bit is set to a "one" during the next C1 clock (i.e. when C1 is high) to prevent the host processor from gaining access), Similarly, when the host processor gains ownership of the resource, the semaphore bit is set during the next C1 clock to prevent the peripheral controller from gaining access. It is to be noted that a "write" from either the peripheral controller or the host processor clears the semaphore bit. Both "reads" or "writes" occur only during a C2 clock. Clock C2 is a clock signal which is 180 degrees out of phase with clock signal C1. The semaphore bit is set during the next C1 clock following a "read" by either processor providing its current state is "zero." Thus, all timing problems have been eliminated during the set operation.

In the discussion to follow, the signals associated with the host or external processor will be designated with uppercase letters and those associated with the peripheral controller or internal processor will be designated with lower case letters. Two types of operations can occur. If either the host processor or the peripheral controller acts upon the semaphore bit in the absence of an operation from the other, the operation is considered to be non-contested. If, on the other hand, an operation from one occurs simultaneously with an operation from the other, the operation is referred to as contested.

Non-contested operations of the semaphore bit are summarized in Table 1. $S(t)$ or $s(t)$ indicate the state of the semaphore as read by the external processor or the peripheral controller respectively. The symbol $s(t)$ is the actual state of the semaphore and is the value read by the internal processor. $S(t)$ is the same as $s(t)$ in all cases except the one for simultaneous reads of a semaphore whose actual value is zero. (This is a contested operation discussed below.) R/W or r/w indicate a read/write signal emanating from the host processor or peripheral controller respectively, and $s(t+C1)$ indicates the next state of the semaphore.

TABLE 1

| | $S(t)$ or $s(t)$ | R/W or r/w | $s(t + C1)$ |
|---|---|---|---|
| 1 | 0 | r or R | 1 |
| 2 | 1 | r or R | 1 |
| 3 | 0 | w or W | 0 |
| 4 | 1 | w or W | 0 |

Line 1 of Table 1 indicates that the value of the semaphore bit as seen by the host processor or peripheral controller is zero indicating that the resource (i.e. the RAM) is unowned. Thus, a "read" by the peripheral controller will result in the semaphore bit being set during the next C1. In line 2, a "read" by the peripheral controller or the host processor sees a semaphore bit which is set and thus owned by the host processor. The read signal has no affect on the semaphore bit and thus it remains a one during the next C1.

As stated previously, a "write" by either the host processor or the peripheral controller will reset the semaphore bit. In line 3 of Table 1, the "write" by either the host processor or the peripheral controller will have no affect on the semaphore bit since it is already a zero. However, in line 4, the semaphore bit is set at time t and is therefore reset at time $t+C_1$ in response to a write signal from either the host processor or the peripheral controller.

Table 2 summarizes the family of simultaneous or contested operations which may occur. Beginning with line 1, if the semaphore bit as seen by the peripheral controller is a zero, a read (r) by the peripheral controller must result in the semaphore being set at time $t+C1$. Furthermore, if the host processor should simultaneously read the semaphore bit as is the case in line 1, logic within the semaphore register must intervene so as to indicate to the host processor that the semaphore bit $S(t)$ is a logic 1. In this manner, only the peripheral controller will gain access to the resource.

TABLE 2

| | $S(t)$ | R/W | $s(t)$ | r/w | $s(t + C1)$ |
|---|---|---|---|---|---|
| 1 | 1 | R | 0 | r | 1 |
| 2 | X | W | 1 | r | 0 |
| 3 | 1 | R | 1 | w | 0 |
| 4 | 1 | R | 1 | r | 1 |
| 5 | X | W | 0 | w | 0 |
| 6 | X | W | 0 | r | 1 |
| 7 | X | W | 1 | w | 0 |
| 8 | 0 | R | 0 | w | 1 |

If the semaphore bit $s(t)$ is set when the peripheral controller generates a read and the host processor generates a write, the semaphore bit will be reset at time $t+C1$ in response to the write (W). This situation is illustrated in line 2 of Table 2.

In line 3 of Table 2, the semaphore bit is set at time t and a write signal from the peripheral controller will cause it to be reset at time $t+C1$.

In line 4 of Table 2, the semaphore bit is set and read signals from both the host processor and the peripheral controller will have no affect. Thus, the semaphore bit will remain a one at time $t+C1$.

If the semaphore bit is a "zero," write signals from both the peripheral controller and the host processor will have no affect. Thus, the semaphore bit will remain a zero at time $t+C1$ as is shown in line 5 of Table 2.

If the semaphore bit is a "zero" during a write by the host processor and a read by the peripheral controller, the semaphore bit will be set at time $t+C1$ as is shown in line 6.

Line 7 of the Table 2 illustrates the situation where the semaphore bit is set at time t and in response to write signals from both the host processor and the peripheral controller the semaphore bit is reset at time $t+C1$.

Finally, if as in line 8 the semaphore bit is "zero" during a write by the peripheral controller and a read by the host processor, the semaphore bit will be set a time $t+C1$ in response to a read (R) by the host processor.

It should be noted that the peripheral controller always reads the actual state of the semaphore bit while the external processor reads the actual state in all cases except when both the host processor and the peripheral controller simultaneously read an unowned semaphore. In this case, the peripheral controller reads the actual semaphore while an arbitrator inherent in the semaphore circuitry intervenes and substitutes an artificial busy signal for the host processor.

If desired, an ownership bit may be provided which indicates which processor, the peripheral controller or the host processor, was last granted the semaphore bit. When the semaphore bit is zero (unowned), the ownership bit will indicate which processor last owned the semaphore. If the semaphore is not zero, then the state of ownership bit indicates the current owner. If both the semaphore and ownership bits are 1's, it indicates that the processor making the read currently "owns" the semaphore.

Figure 1:
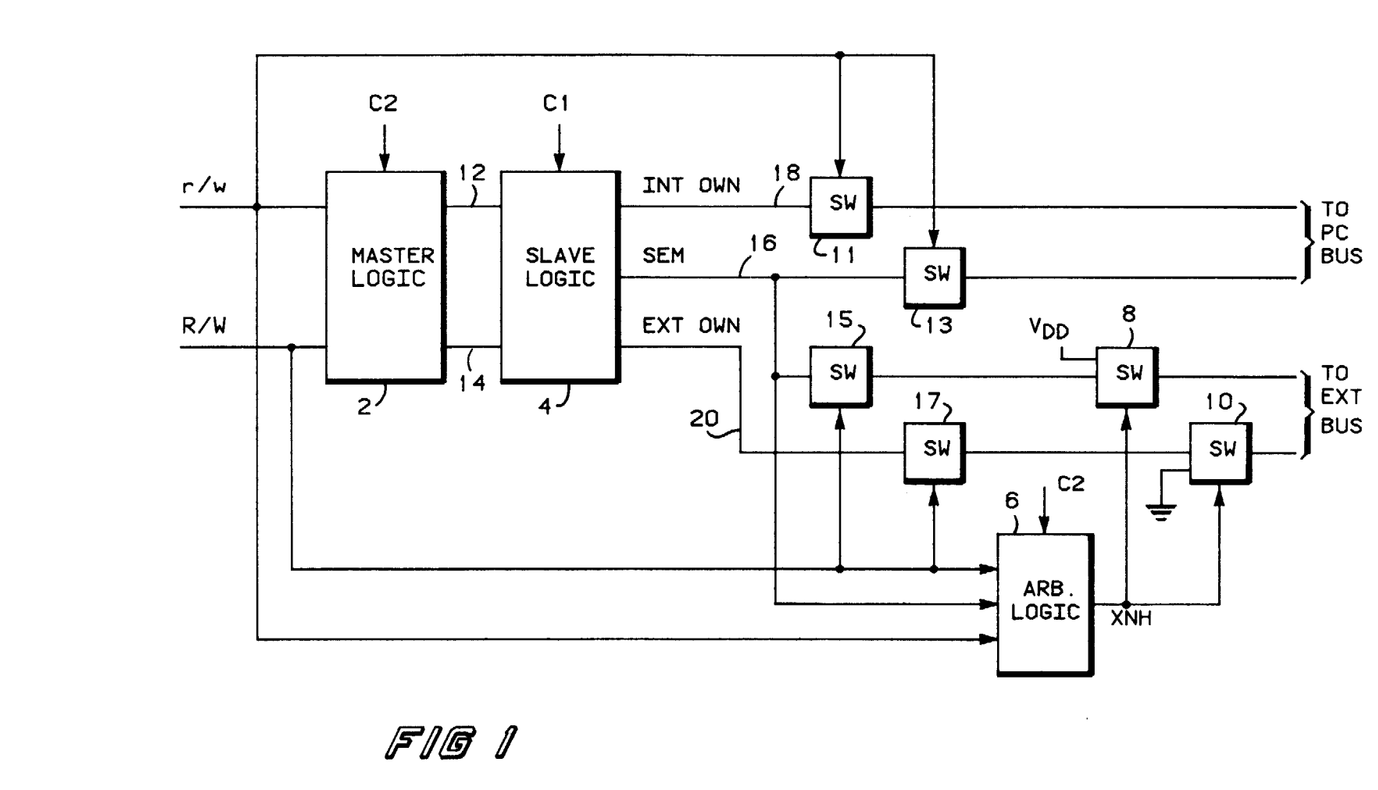
FIG. 1 is a block diagram of the inventive semaphore register.

FIG. 1 is a block diagram of the inventive semaphore register. The circuit includes master logic 2, slave logic 4, arbitration logic 6 and switches 8, 10, 11, 13, 15 and 17. Master logic 2 receives an internal (peripheral controller) read/write signal (r/w), an external (host processor) read/write signal (R/W) and a clock signal C2. The internal r/w signal will be high during a read cycle and low during a write signal. Similarly, the external R/W signal will be high during a read cycle and low during a write cycle. The internal or external read/write signals are clocked into master logic 2 during clock C2. Master logic 2 generates semaphore bit set/reset signals and ownership bit set/reset signals over lines 12 and 14. These signals are applied to slave logic 4 along with clock signal C1 which is equivalent to $\overline{C2}$. On the next occurrence of clock signal C1, slave logic 4 receives inputs over lines 12 and 14 from master logic 2 and generates therefrom signals representing the state of the semaphore bit (line 16) and whether the semaphore is owned internally (line 18) or externally (line 20). The signal indicating internal ownership (line 18) is applied to the input of switch 11 and the semaphore signal (line 16) is applied to the input of switch 13. When the internal processor reads the semaphore register control signal, r/w goes high and turns on switches 11 and 13 thus connecting the internal ownership signal (line 18) and the semaphore signal (line 16) directly to corresponding bits of the peripheral controller bus.

The semaphore signal (line 16) is also applied to the input of switch 15, and the signal indicating external ownership (line 20) is applied to the input of switch 17. When the external processor reads the semaphore register control signal, R/W goes high and turns on switches 15 and 17 and in the absence of a simultaneous read these signals pass through switches 8 and 10 to corresponding bits of the external bus.

Arbitration logic 6 is provided in the event that simultaneous reads from both the peripheral controller and the host processor occur. As can be seen, r/w, R/W, C2 and the semaphore signal are applied as inputs to arbitration logic 6. If the semaphore signal is such as to indicate that the resource (RAM) is available, simultaneous reads by both the host processor and the peripheral controller; (i.e. r/w is high and R/W is high) will result in the arbitration logic 6 generating a signal XNH which is applied to both switch 8 and switch 10. Signal XNH, when high, will cause the output of switch 10 to be grounded and the output of switch 8 to be coupled to $V_{DD}$. Thus, the external bus will see signals which indicate that (1) the semaphore bit is set and thus owned, and (2) that the peripheral controller has ownership. This represents the only situation wherein the external data bus does not see the actual states of both the semaphore and the external ownership line.

Figure 2:
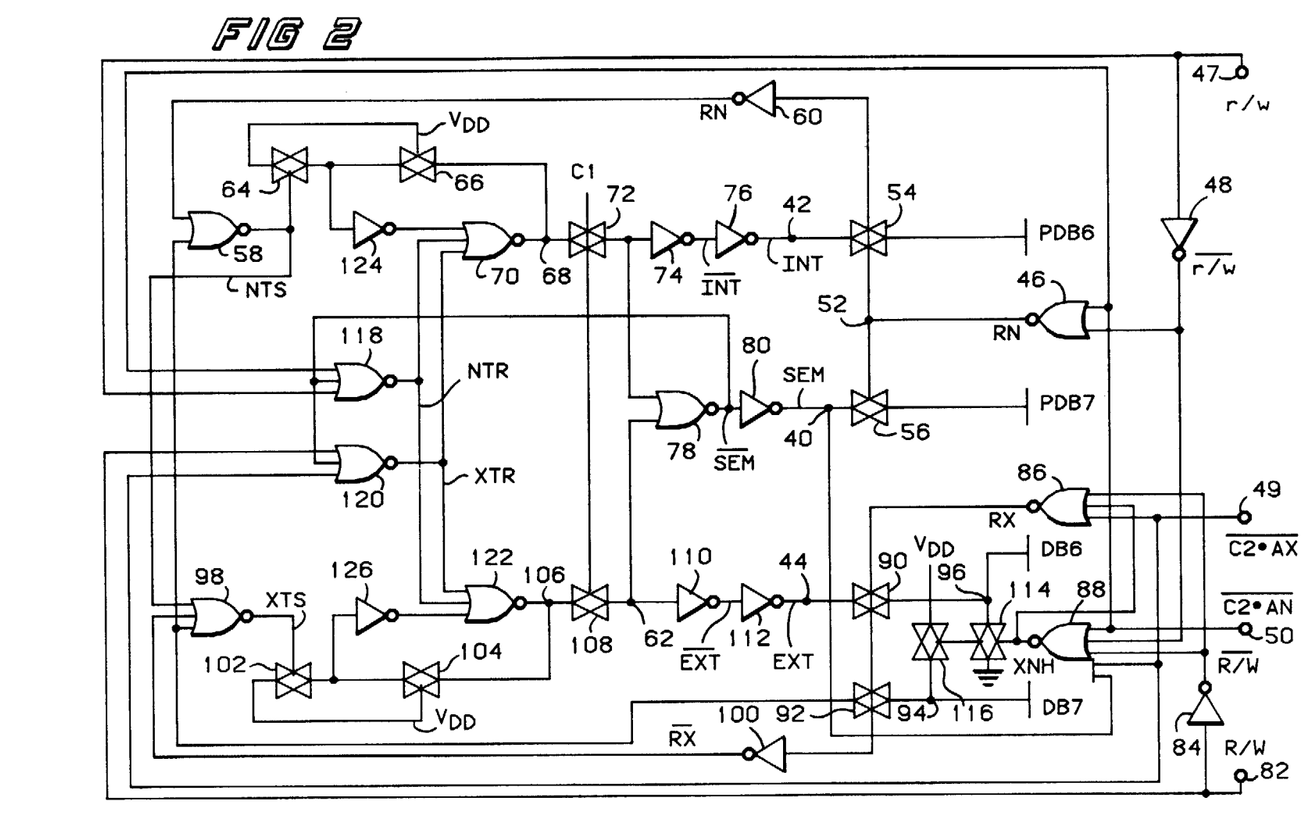
FIG. 2 is a logic diagram of a first implementation of the inventive semaphore register.

FIG. 2 illustrates one implementation of the inventive semaphore register. While in practice, a plurality of such registers will reside in the equipment, only one such register is shown in FIG. 2. The state of the semaphore is monitored at node 40, the peripheral controller or internal ownership bit is monitored at node 42, and the host processor or external ownership bit is monitored at node 44. There are only three permitted states. First, the monitored resource is available when the semaphore and both ownership bits are zero (reset). Second, the monitored resource is owned by the peripheral controller when the semaphore and internal ownership bits are both one (set) and the host processors or external ownership bit is zero (reset). Finally, the monitored resource is owned externally (by the host processor) when the semaphore and external ownership bits are both one and the peripheral controller's ownership bit is zero.

To facilitate an explanation of the circuit shown in FIG. 2, it will first be assumed that the resource is available, i.e., that the semaphore at node 40 is zero and that both ownership bits at nodes 42 and 44 are likewise zero. In this condition, an external read signal will grant access to the external user (i.e. the host processor) and either a peripheral controller read or a simultaneous peripheral controller read and external read will grant access to the peripheral controller. Both external and peripheral controller "writes" have no affect when the resource is available (i.e. when the semaphore is reset).

For purposes of the following discussion, r/w shall designate a read/write signal from the peripheral controller. When this signal is set (a one) it shall represent a read signal and when reset (zero) it shall represent a write signal. NOR gate 46 has a first input which is coupled to the output of inverter 48 which in turn has an input coupled to r/w at terminal 47. The second input of NOR gate 46 is coupled to node 50 at which appears the logic function $\overline{C2}\cdot AN$ where C2 is a clock signal which is 180 degrees out of phase with clock signal C1 and where AN is a signal which represents the decoded semaphore registers' address. A read control signal (RN = r/w·C2·AN) at node 52 goes high when the peripheral controllers r/w line goes high (a read) and the semaphore register's address (AN) is decoded. Read control signal RN opens two couplers 54 and 56. Coupler 54 couples the semaphore bit (SEM) at node 40 to a first bit of the peripheral controller's bus which is designated PDB7. Coupler 54 couples the peripheral controller's ownership bit (INT) at node 42 to a second bit of the peripheral controller's bus designated PDB6. Simultaneously, the peripheral controller's ownership bit set signal (NTS = $\overline{SEM}\cdot RN$) is generated at the output of NOR gate 58 which has a first input coupled to read control signal $\overline{RN}$ via inverter 60 and a second input which is coupled to the semaphore bit (SEM) appearing at node 40. That is, the peripheral controller's ownership bit set signal is generated when RN goes high while the semaphore bit SEM remains low.

The peripheral controller's ownership bit set signal NTS is applied to coupler 64 which causes a high signal to be latched at node 68 (the output of NOR gate 70). When the next C1 clock signal occurs (goes high) coupler 72 is turned on causing the signal appearing at node 68 to be transferred through inverters 74 and 76 to node 42 which represents the peripheral controller's ownership bit. Thus, the peripheral controller's ownership bit is set. The signal appearing at node 68 is also applied at clock C1 to a first input of NOR gate 78 the output of which is coupled through inverter 80 to node 40. Thus, a logical one applied to NOR gate 78 from node 68 will cause the semaphore bit at node 40 to go high. Any subsequent read will indicate that the peripheral controller owns the resource because both its semaphore and its ownership bit (INT) are now set.

The external or host processor's read/write signal (R/W) is high during an external read and low during an external write. This signal is supplied via terminal 82 and inverter 84 to first inputs of NOR gates 86 and 88. The function $\overline{C2 \cdot AX}$ is applied to second inputs of NOR gates 86 and 88 where AX is a signal which represents the decoded semaphore register's address. The output of NOR gate 86 (RX) goes high when there is a simultaneous occurrence of R/W, C2 and AX. Output RX, when high, opens two couplers 90 and 92. Coupler 92 connects the semaphore bit at node 40 to a bit of the external bus at node 94 (DB7). Coupler 90 connects the external ownership bit (EXT) at node 44 to bit 6 of the external bus at node 96 (DB6).

The external ownership bit set signal (XTS = $\overline{SEM \cdot NTS} \cdot RX$) is generated at the output of NOR gate 98 which has a first input coupled to the output of NOR gate 58 (NTS), a second input coupled to the output of NOR gate 86 (RX) via inverter 100 ($\overline{RX}$), and a third input coupled to SEM at node 40. When the external ownership bit set signal (XTS) goes high, a high is applied to node 106 via inverter 126 and NOR gate 122. That is, when XTS is high, coupler 102 is open permitting $V_{DD}$ to pass to the input of inverter 126. When clock signal C1 next goes high, coupler 108 is opened causing the high signal appearing at node 106 to pass to node 62 and therefore to the second input of NOR gate 78 and to the input of inverter 110. Thus, the output of NOR gate 78 goes low causing the semaphore bit at node 40 to go high. Similarly, the low output of inverter 110 is applied to the input of inverter 112. The output of inverter 112 represents external ownership bit when it goes high. To summarize, when the resource is available and an external read signal is generated, both the semaphore bit and the external ownership bit go high assuming there has not been a simultaneous internal read.

If reads are generated by the peripheral controller and the host processor simultaneously, the signal XNH = $\overline{SEM \cdot r/w \cdot R/W \cdot C2 \cdot AN \cdot AX}$ goes high at the output of NOR gate 88. This signal forms the third input of NOR gate 86. Thus, the output of NOR gate 86 (RX) is inhibited when there is a simultaneous read from both the peripheral controller and the host processor. Thus, the normal external read process is prevented. Instead, XNH turns on two couplers 114 and 116. When turned on by XNH, coupler 114 will cause a low signal (ground) to be applied to node 96 and therefore external bus bit DB6. Coupler 116 will cause a high (VDD) to be applied to node 94 and therefore to external bus bit DB7. In contrast, the peripheral controller read signal (RN) at the output of NOR gate 46 is not inhibited and initiates the internal read process previously described.

In addition to the external read signal (RX) being inhibited by XNH, the external ownership bit set signal (XTS) is inhibited by the output of NOR gate 58 (NTS) to prevent the external ownership bit (EXT) at node 44 from being set.

The next situation to be described is one wherein the resource is owned by the peripheral controller. When the semaphore bit and the peripheral controller's ownership bit are both high, a peripheral controller read signal couples these bits to the peripheral controller's bus as previously described thus indicating ownership by the peripheral controller. Because the external ownership set signal (XTS) is suppressed by either peripheral controller ownership or simultaneous reads from the peripheral controller and host processor, the external ownership bit (EXT) cannot be set while the internal ownership bit (INT) is also set. Therefore, an external read (RX) will couple SEM = 1 and EXT = 0 to the external bus, thus indicating to the host processor that the semaphore is currently owned by the peripheral controller.

A peripheral controller reset signal (NTR = $\overline{r/w} \cdot C2 \cdot AN \cdot SEM$) is generated at the output of NOR gate 118 when the peripheral controller's r/w line goes low and the semaphore's address AN is decoded. A host processor reset signal (XTR = $\overline{R/W} \cdot C2 \cdot AX \cdot SEM$) is generated at the output of NOR gate 120 when the external R/W line goes low and the semaphore's external address AX is decoded. Both NTR and XTR from NOR gates 118 and 120 are applied to inputs of NOR gates 70 and 122. The third input to NOR gate 70 is coupled to the output of inverter 124, and the third input to NOR gate 122 is coupled to the output of inverter 126. Both NTR and XTR act as reset signals for the ownership bits. If INT = 1, then node 68 will be high and either NTR or XTR or both will reset node 68. On the next C1 clock, INT at node 42 and SEM at node 40 will both reset thus indicating that the resource is again available.

When the resource is owned by the host processor, the semaphore SEM at node 40 and the external ownership bit EXT at node 44 are both high. An external read (R/W = 1) couples these bits to bits of the external bus as previously described thus indicating external or host processor ownership. Since the peripheral controller's ownership set signal (NTS = $\overline{SEM} \cdot RN$) at the output of NOR gate 58 is suppressed by external ownership, the peripheral controller's ownership bit (INT) cannot be set. Therefore, a peripheral controller read signal (RN) will couple the semaphore bit (SEM = 1) and INT = 0 to the peripheral controller's bus thus indicating that the resource is owned by the external or host processor.

Either a peripheral controller write, an external write, or both will reset both the semaphore at node 40 and the external ownership bit (EXT) at node 44 by causing the output of NOR gate 122 to go low.

Figure 3:
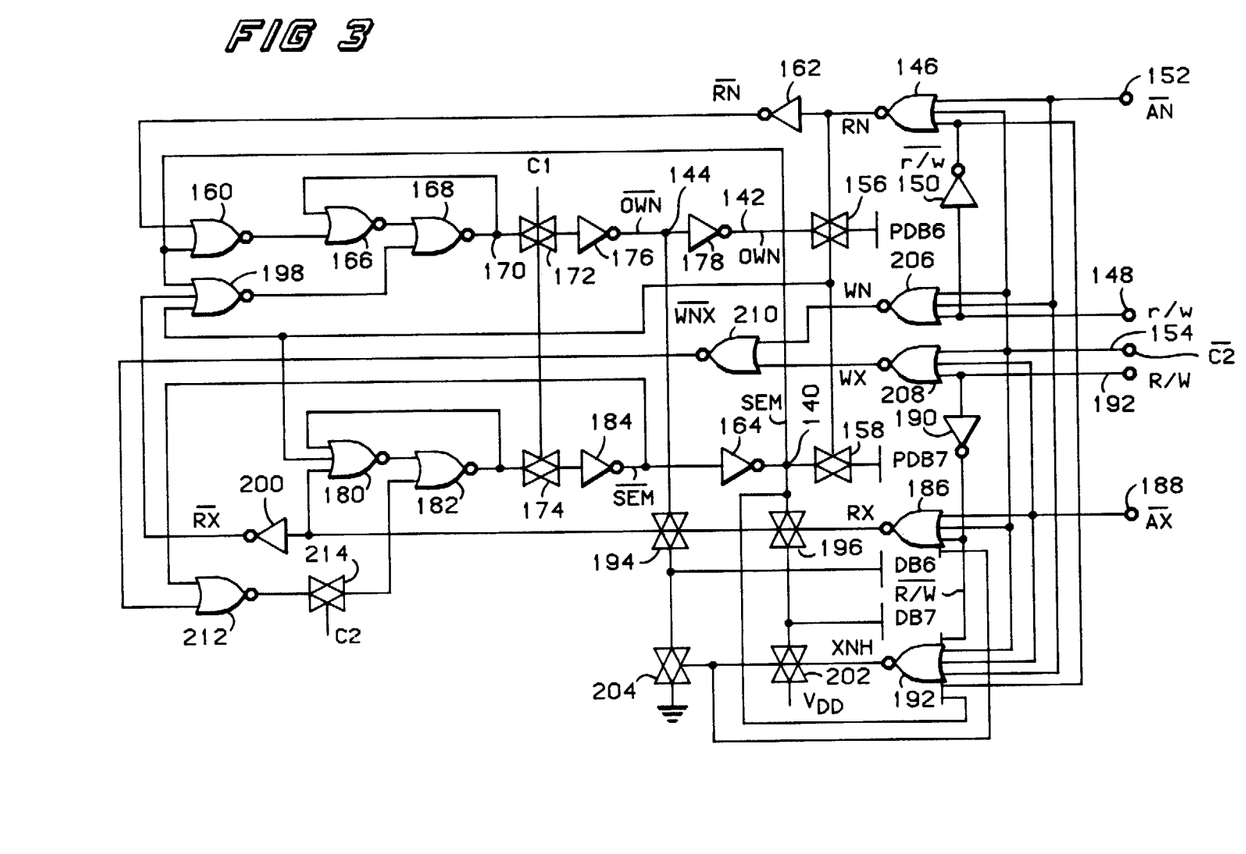
FIG. 3 is a logic diagram of a second implementation of the inventive semaphore register.

FIG. 3 is a logic diagram of a second embodiment of the inventive semaphore register. In this embodiment, there is a single semaphore bit and a single ownership bit. The semaphore bit is monitored at node 140, the internal ownership bit (OWN) is monitored at node 142 and the inverted ownership bit ($\overline{OWN}$) is monitored at node 144. There are four permitted states. First, the monitored resource may be available (unowned) when the semaphore (SEM) is reset (low) and was last owned internally when the ownership bit OWN is set. Second, the monitored resource is available when the semaphore is reset and was last owned externally when the ownership bit is reset; i.e. $\overline{OWN}$ is high. Third, the monitored resource is internally owned when both the semaphore and ownership bit are set. Finally, the monitored resource is externally owned when the semaphore is set and the ownership bit is reset; i.e. $\overline{OWN}$ is high.

When the resource is available (i.e. when the semaphore bit is reset), an external read signal will grant access to the external user (host processor) and either an internal read or simultaneous internal and external reads will grant access to the internal user (peripheral controller). Neither external nor internal writes have any effect when the resource is available.

Logic NOR gate 146 has a first input coupled to the internal read signal (r/w) at terminal 148 after inversion by inverter 150. A second input of NOR gate 146 is coupled to $\overline{AN}$ at terminal 152, and a third input of NOR gate 146 is coupled to $\overline{C2}$ at terminal 154. An internal read signal (RN=r/w·AN·C2) goes high at the output of NOR gate 146 during clock time C2 when the internal r/w line goes high and the semaphore address (AN) is decoded. The output RN, when high, opens couplers 156 and 158 which (1) couple the internal ownership bit OWN at node 142 to a bit PDB6 of the internal bus, and (2) couple the semaphore bit at node 140 to another bit of the internal bus PDB7.

Logic NOR gate 160 has a first input coupled to RN at the output of inverter 162 and a second input coupled to semaphore bit (SEM) at node 140 which is the output of inverter 164. The output of NOR gate 160 (RN·$\overline{SEM}$) is the internal ownership set signal and is generated when RN goes high while the semaphore SEM remains low. The output of NOR gate 160 causes the master portion of the ownership flip-flop (NOR gates 166 and 168) to latch a high state at node 170 during clock pulse C2. Clock signal C1 (which equals $\overline{C2}$) is coupled to couplers 172 and 174. Thus, when clock C1 goes high, coupler 172 is turned on and transfers the high state from the master section of the flip-flop at node 170 to the slave section node 142 via inverters 176 and 178.

The semaphore portion of the circuit also includes a master/slave flip-flop, the master comprising NOR gates 180 and 182 and the slave portion comprising inverters 184 and 164. NOR gate 180 has a first input coupled to RN at the output of NOR gate 146, a second input coupled to the output of NOR gate 182 and a third input coupled to the external read signal (RX) emanating from the output of NOR gate 186. Thus, when RN goes high the output of NOR gate 182 also goes high. During the next C1, this high is transferred to node 140 via inverters 184 and 164. Subsequent reads will indicate internal ownership since both the ownership bit and the semaphore bit are now set.

NOR gate 186 has a first input coupled to $\overline{AX}$ at terminal 188, a second input coupled to C2 at terminal 154 and a third input coupled to $\overline{R/W}$ at the output of inverter 190 which in turn has an input coupled to the external read/write signal (R/W) at terminal 192. A fourth input is coupled to the output of NOR gate 192 (XNH) to be more fully described below. An external read signal (RX) appears at the output of NOR gate 186 if XNH is low upon the simultaneous occurrence of C2, AX and R/W. This signal opens couplers 194 and 196. Coupler 196 when opened connects the semaphore bit to a bit of the external bus (DB7) while coupler 194 when opened connects the external ownership bit (node 144) to a different bit of the external bus (DB6). The external read (RX) is also applied to a first input of NOR gate 198 after inversion in inverter 200. NOR gate 198 also has a second input coupled to the semaphore bit (SEM) at node 140, and a third input coupled to the internal read signal (RN). The output of NOR gate 198 is coupled to an input of NOR gate 168. Thus, when RX is high and RN and SEM are low, a high will appear at the output of NOR gate 198. As a result, the output of NOR gate 168 will go low; i.e. the master portion of the ownership flip-flop has been reset. At the next C1, the low appearing at node 170 will be transmitted to node 142 via inverters 176 and 178, and the external ownership bit ($\overline{OWN}$) appearing at node 144 will go high. The external read signal (RX) is also applied to an input of NOR gate 180 which will cause the semaphore bit at node 140 to be set in a manner similar to that which occurred when the internal read signal (RN) went high. Subsequent read signals will now indicate external ownership since $\overline{OWN}$ at node 144 is set and the semaphore bit at node 140 is set.

NOR gate 192 has a first input coupled to $\overline{RW}$ at the output of inverter 190, a second input coupled to $\overline{C2}$ at terminal 154, a third input coupled to $\overline{AX}$ at terminal 188, a fourth input coupled to $\overline{AN}$ at terminal 152, a fifth input coupled to the $\overline{r/w}$ at the output of inverter 150, and a sixth input coupled to the semaphore bit at node 140. Thus, if simultaneous internal and external reads should occur while SEM=0, the output of NOR gate 192 will go high. In this case, the internal read signal (RN) at the output of NOR gate 146 is generated as previously described. However, the output of NOR gate 192 is fed back to an input of NOR gate 186 to inhibit the generation of the external read signal RX in the event of simultaneous internal and external reads. The output of NOR gate 192, when high, also opens couplers 202 and 204. Coupler 202, when open, couples bit DB7 of the external bus to a high (VDD), and coupler 204, when open, couples bit DB6 of the external bus to ground. Thus, it will appear that the resource is in use by the internal user. Meanwhile, the internal read signal (RN) sets both the ownership bit and the semaphore as previously described connecting bits PDB6 and PDB7 of the internal bus to the ownership (OWN) and semaphore (SEM) bits respectively. Subsequent external, internal or simultaneous reads will indicate that SEM and OWN are set (i.e. the internal user has ownership). The low at the output of inverter 176 ($\overline{OWN}$) indicates that the external user does not have ownership. When the resource is owned externally, SEM is set and OWN is reset. Therefore, any subsequent external, internal or simultaneous reads will indicate that the external user has ownership. It is to be noted that if SEM is set, indicating that the resource is unavailable, XNH at the output of NOR gate 192 will not go high. Thus, the true states of SEM, $\overline{OWN}$ and OWN will be coupled to their respective destinations.

NOR gate 206 has a first input coupled to $\overline{C2}$ at terminal 154, a second input coupled to $\overline{AN}$ at terminal 152 and a third input coupled to the internal read write signal (r/w) at terminal 148. NOR gate 108 has a first input coupled to C2 at terminal 154, a second input coupled to $\overline{AX}$ at terminal 188 and a third input coupled to the external read write signal (R/W) at terminal 192. If r/w goes low (an internal write) or R/W goes low (an external write) or both go low simultaneously, the output of NOR gate 210 having a first input coupled to the output of NOR gate 206 and a second input coupled to the output of 208 will go low during clock time C2.

The output of NOR gate 210 is coupled to a first input of NOR gate 212. The second input of NOR gate 212 is coupled to $\overline{SEM}$ at the output of inverter 184. If $\overline{SEM}$ and $\overline{WNX}$ are both low, a high will appear at the output of NOR gate 212. Thus, a write whether or not accompanied by a simultaneous read will cause the output of NOR gate 212 to go high during C2 whenever the semaphore is set. If a simultaneous read and write occur when the semaphore is not set, the output of NOR gate 212 will not go high and the circuit's response to the read signal will be as described above.

During the next C2 clock, coupler 214 is opened connecting the output of NOR gate 212 to an input of NOR gate 182. If the output of NOR gate 212 was high, the output of NOR gate 182 will be forced low. On the next C1 clock signal, coupler 174 will be opened and the low value at the output of NOR gate 182 will be transmitted to node 140 thus resetting the semaphore.

When the output of NOR gate 210 again goes high, the output of NOR gate 212 is driven low where it remains until the next write occurs when the semaphore bit is set. When clock C2 again goes high, the low at the output of NOR gate 212 is applied to the input of NOR gate 182. Thus, the semaphore master section remains latched in a reset condition until the next read signal.

The above description is given by way of example only. Changes in form and details may be made by one skilled in the art without departing from the scope of the invention as defined by the appended claims.

We claim:

1. A semaphore register for use in a data processing system to indicate the status of a resource shared by first and second processors, comprising:
   master latch means for providing a semaphore signal in a first state in response to a set signal and in a second state in response to a reset signal, said first state indicating unavailability of said resource and said second state indicating availability of said resource;
   first slave latch means coupled to said master latch means, for latching the state of said semaphore signal during a first clock interval;
   set logic means coupled to said master and first slave latch means and to said first and second processors, for providing said set signal to said master latch means if, during a second clock interval following said first clock interval, said semaphore signal is in said second state and a first control signal is received from either of said processors;
   reset logic means coupled to said master and first slave latch means and to said first and second processors, for providing said reset signal to said master latch means if, during said second clock interval, said semaphore signal is in said first state and a second control signal is received from either of said processors;
   output means coupled to said first slave latch means and to said first and second processors, for providing to said first and second processors a respective output signal corresponding in state to said latched semaphore signal in response to receiving said first control signal respectively therefrom during said second clock interval; and
   arbitration logic means coupled to said output means and to said first and second processors, for forcing the output signal provided by said output means to said second processor to said first state to indicate that said resource is unavailable, in response to simultaneously receiving said first control signals from both of said processors.

2. A register according to claim 1 further comprising:
   second master latch means for providing an ownership signal in a first state in response to a second set signal and in a second state in response to a second reset signal, said first state of said ownership signal indicating ownership of said resource by said first processor and said second state of said ownership signal indicating ownership of said resource by said second processor;
   second slave latch means coupled to said second master latch means, for latching the state of said ownership signal during said first clock interval;
   second set logic means coupled to said second master latch means, said first slave latch means and to said first processor, for providing said second set signal to said second master latch means if, during said second clock interval, the semaphore signal latched by said first slave latch means is in said second state thereof and said first control signal is received from said first processor;
   second reset logic means coupled to said second master latch means, said first slave latch means and to said first and second processors, for providing said second reset signal to said second master latch means if, during said second clock interval, the semaphore signal latched by said first slave latch means is in said second state thereof and said first control signal is received from said second processor but not from said first processor;
   second output means coupled to said second slave latch means and to said first and second processors, for providing to said first and second processors an output signal corresponding in state to said latched ownership signal in response to receiving said first control signal respectively therefrom during said second clock interval; and
   second arbitration logic means coupled to said second output means and to said first and second processors, for forcing the output signal provided by said second output means to said second processor to said first state thereof to indicate that said resource is owned by said first processor, in response to simultaneously receiving said first control signals from both of said processors.

3. A semaphore register for use in a data processing system to indicate the status of a resource shared by first and second processors, comprising:
   first master latch means for providing an internal ownership signal in a first state in response to a first set signal and in a second state in response to a first reset signal, said first state of said internal ownership signal indicating ownership of said resource by said first processor;
   second master latch means for providing an external ownership signal in a first state in response to a second set signal and in a second state in response to a second reset signal, said first state of said external ownership signal indicating ownership of said resource by said second processor;
   slave latch means coupled to said first and second master latch means, for latching the state of said internal and external ownership signals during a first clock interval, and for providing a semaphore signal in a first state if either of said latched ownership signals is in said first state thereof and in a second state if neither of said latched ownership signals is in said first state thereof;
   first set logic means coupled to said first master and said slave latch means and to said first processor, for providing said first set signal to said first master latch means if, during a second clock interval following said first clock interval, said semaphore signal is in said second state and a first control signal is received from said first processor;
   first reset logic means coupled to said first master latch means, said slave latch means and said first processor, for providing said first reset signal to said first master latch means if, during said second clock interval, said semaphore signal is in said first state and a second control signal is received from said first processor;

second set logic means coupled to said second master and said slave latch means and to said second processor, for providing said second set signal to said second master latch means if, during a second clock interval following said first clock interval, said semaphore signal is in said second state and a first control signal is received from said second processor;

second reset logic means coupled to said second master latch means, said slave latch means and said second processor, for providing said second reset signal to said second master latch means if, during said second clock interval, said semaphore signal is in said first state and a second control signal is received from said second processor;

output means coupled to said slave latch means and to said first and second processors, for providing to said first and second processors a respective output signal corresponding in state to a respective one of said latched ownership signals and a second output signal corresponding in state to said semaphore signal in response to receiving said first control signal respectively therefrom during said second clock interval; and arbitration logic means coupled to said output means and to said first and second processors, for forcing the output signal provided by said output means to said second processor to said first state to indicate that said resource is unavailable, in response to simultaneously receiving said first control signals from both of said processors.

* * * * *